US008564664B2

(12) United States Patent

Lemire

(10) Patent No.: US 8,564,664 B2

(45) Date of Patent: Oct. 22, 2013

(54) SURVEILLANCE SYSTEM

(75) Inventor: Martin Lemire, Drummondville (CA)

(73) Assignee: 9174-8517 Québec Inc., Drummondville (CA)

( * ) Notice: Subject to any disclaimer, the term of this patent is extended or adjusted under 35 U.S.C. 154(b) by 843 days.

(21) Appl. No.: 12/583,795

(22) Filed: Aug. 26, 2009

(65) Prior Publication Data

US 2010/0053328 A1 Mar. 4, 2010

(30) Foreign Application Priority Data

Aug. 26, 2008 (CA) .................................... 2639137

(51) Int. Cl.
*H04N 7/18* (2006.01)

(52) U.S. Cl.
USPC .................. 348/148; 701/1; 701/35; 701/36; 340/901; 340/905

(58) Field of Classification Search
USPC ................ 348/148, 143, 149, 161, 184, 189, 348/207.1, 208.14, 208.15
See application file for complete search history.

(56) References Cited

U.S. PATENT DOCUMENTS 6,389,339 B1 * 5/2002 Just .............................. 701/31.4
7,183,946 B2 * 2/2007 Boudrieau ..................... 340/945
7,555,378 B2 * 6/2009 Larschan et al. ............. 701/32.5
2004/0073440 A1 * 4/2004 Garbers et al. .................... 705/1
2005/0278082 A1 * 12/2005 Weekes ............................ 701/1
2006/0103550 A1 * 5/2006 Vickas .......................... 340/901
2007/0014439 A1 * 1/2007 Ando ............................ 382/118
2007/0239331 A1 * 10/2007 Kaplan .......................... 701/36
2008/0319604 A1 * 12/2008 Follmer et al. .................. 701/35
2009/0096636 A1 * 4/2009 Vickas .......................... 340/905
2009/0115634 A1 * 5/2009 Liang ............................ 340/941
2009/0231429 A1 * 9/2009 Hardee et al. ................. 348/148
2009/0259396 A1 * 10/2009 He ............................... 701/211

OTHER PUBLICATIONS

Gale Group, "Motorola Signs Contract With Michigan to Explore the Wireless Super Highway", PR Newswire Association, Nov. 8, 2005.*

* cited by examiner

*Primary Examiner* — Barbara Burgess
(74) *Attorney, Agent, or Firm* — Fasken Martineau DuMoulin LLP; Alexandre Abecassis

(57) ABSTRACT

A method for monitoring motor vehicle traffic wherein the motor vehicles being monitored have an onboard computer and an interlock system whereby the motor vehicle can be operated, fully, limited or not, after a driver identification has been entered into the computer, the method comprising the steps of providing GPS input into the computer, providing one emitter and a monitored zone wherein the emitter provides at least one traffic parameter to the computer such that the computer records any infraction of the parameter, and sending information about the infraction to a governmental authority and stores it on the driver's identification card.

12 Claims, 1 Drawing Sheet

SURVEILLANCE SYSTEM

FIELD OF THE INVENTION

The present invention relates to a sunlight based traffic control system for monitoring and reporting various traffic violations.

BACKGROUND OF THE INVENTION

Traffic surveillance systems are well known in the prior art as exemplified by U.S. Pat. No. 4,591,823 which teaches a traffic speed surveillance system which comprises a set of transceivers located along a roadway and in communication with a central processor. A vehicle transceiver is mounted in a vehicle and includes means for entering driver identification, vehicle identification and a speedometer for measuring the speed of the vehicle. The vehicle transceiver receives radio signals from a monitor transceiver which can identify the speed limit and compares measured speed against the limit and sends radio signals indicative of driver identification, vehicle identification and speed limit violation to the central processor.

A further traffic surveillance system which is illustrated in U.S. Pat. No. 5,952,941 utilizes a plurality of satellites which can pick up violation signals from a vehicle and signal the position of vehicles or cars to computers located at a central position.

SUMMARY OF THE INVENTION

It is an object of the present invention to provide a traffic surveillance system which utilizes existing equipment to minimize the cost of installation. It is foreseen that the equipment and software can be installed as the vehicle is manufactured and can utilize existing GPS technology.

According to one aspect of the present invention, there is provided a method for monitoring motor vehicle traffic wherein the motor vehicles being monitored have an onboard computer and an interlock system whereby the motor vehicle can only be operated after a driver identification has been entered into the computer, the method comprising the steps of providing GPS input into the computer, providing one emitter in a monitored zone, the emitter providing at least one traffic parameter to the computer whereby the computer records an infraction of said parameter, and sending information about the infraction to a governmental authority.

According to a further aspect of the present invention, there is provided a method for monitoring motor vehicle traffic comprising the steps of providing motor vehicles having an on-board computer, providing an interlock system whereby the motor vehicle can only be operated after a driver identification has been entered into the computer, providing GPS input into the computer, providing one emitter in a monitored zone, the emitter providing at least one traffic parameter to the computer whereby the computer records an infraction, and sending information about the infraction to a governmental authority, and storing information on the driver's identification card.

As utilized herein, the term computer refers to any electronic device having memory and the capability of sending and receiving signals. It is used in the generic sense wherein any computing device such as used in modern day vehicles is included.

The term governmental authority refers to any organization having responsibility for the monitoring and enforcing of traffic laws including Police and other traffic law enforcement organizations.

The surveillance system of the present invention is particularly suitable to replace other types of systems such as surveillance cameras installed at desired locations such as red lights, stop signs, designated zones such as school zones, hospitals, etc. Naturally, it could be used in many other locations if so desired.

In a preferred embodiment, the designated or protected zone would have means advising the vehicle that it is entering into a zone which is being monitored. This could be accomplished by many different means including signs or alternatively, a signal would activate a visual or audio warning within the vehicle. This warning would be effective to safeguard the privacy of the vehicle operator since it is a choice the vehicle operator makes as to whether to enter the monitored zone.

The surveillance system, upon being activated, can register the position of the vehicle, movement of the vehicle, time and speed. If desired, other parameters could also be monitored. For example, at a stop sign, the vehicle surveillance system could monitor whether the vehicle actually did stop. Similarly, in the instance of a red light, a surveillance system could be in communication with an emitter which would give the times for the various light cycles. This information could be stored on the vehicle system and used to determine whether the vehicle went through a red light. Alternatively, the emitter may only be utilized to send a signal when the light is red and this can be correlated with any movement on the part of the vehicle.

If desired, other capabilities could be added to the system. Thus, one could utilize sensors to register abrupt movement of the vehicle. Similarly, cameras could be utilized, (both front and rear) with a closed loop capability such that the last seconds (amount of time to be determined) could be recorded. This would be useful in many accident situations. Such capabilities are well known in other applications.

Other capabilities could be added to the system. Thus, one could have various interfaces with operating capabilities of the vehicle. For example, a vehicle could be programmed such that it would only start with a personal identifier such as an electronic driver's license card and pin number such that the operator of the vehicle would be known to the computer. This could be utilized to limit the number of kilometers or time of day that a particular operator could drive the vehicle. Such an arrangement would be useful and, due to past infractions, an operator is only permitted to drive the vehicle between a place of work and a residence. Alternatively, such a capability could be utilized to limit the times in which a new driver could operate the vehicle or indeed, even on which roads the driver is permitted.

The vehicle could include the capability of being remotely stopped. Thus, it is within the scope of the present invention that a warning would first of all be given to the driver that the vehicle will stop in a certain amount of time or within a certain distance. It would then be up to the operator to pull the vehicle off the road or alternatively, the vehicle could be remotely controlled to be gently slowed down.

All infraction information will preferably be stored on the identification and storage media used to identify the driver.

The surveillance system can be utilized with remotely placed receptors which would upload information from the vehicle computer. This could be done either at certain times or when passing certain locations.

It is believed that the system as identified above would eliminate some of the problems presently associated with remote identification of traffic laws. Initially, since the system preferably can identify the driver, any infractions will be traced to the driver and not to the owner of the vehicle (as is presently the case). The system would preferably operate with a touch screen as is well known in the art.

BRIEF DESCRIPTION OF THE DRAWINGS

An embodiment of the present invention is illustrated in the accompanying drawings wherein.

DETAILED DESCRIPTION OF THE INVENTION

The vehicle 10 can be started only if the interlock system 20 authenticates the driver.

This is preferably done by means of a coded card such as a driver's license which has a chip thereon. The coded card must remain in the interlock system for the vehicle to operate.

Figure 1:
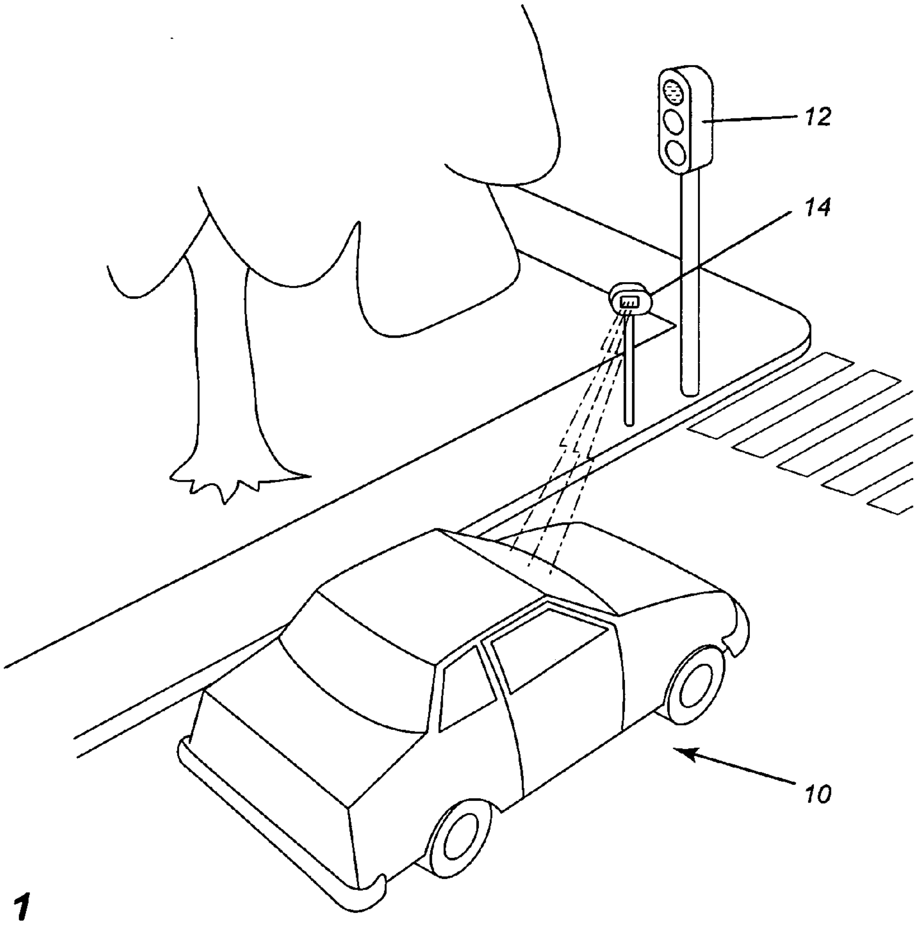
FIG. 1 is a schematic view of a vehicle at an intersection.
Figure 2:
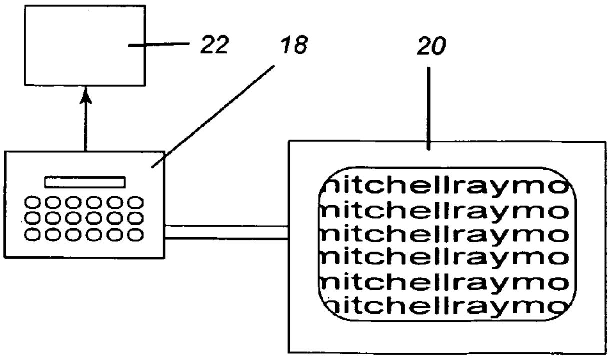
FIG. 2 is a schematic view of the arrangement utilized.

As shown in FIG. 1, a vehicle is stopped at an intersection. An emitter 14 sends a signal giving the identification of the location and it's specific traffic regulation, including the time for various light cycles. This information is received by computer 18 and is used to determine whether the vehicle is in infraction. If in infraction, the information is stored on the coded card (driver's license) and on the computer 18.

When the vehicle is nearby a download location the infraction is transmitted to the governmental authorities.

It will be understood that the above described embodiments are for purposes of illustration only and that changes and modifications may be made thereto without departing from the spirit and scope of the invention.

I claim:

1. A method of monitoring traffic of a plurality of motor vehicles, each of the plurality of motor vehicles having an on-board computer, the on-board computers receiving motor vehicle position data of associated ones of the plurality of motor vehicles, the method comprising:

emitting by an emitter a signal adapted to be received by the on-board computer of the at least one of the motor vehicles, the signal including at least one traffic parameter, the emitter having an associated monitored geographic zone;

detecting that at least one of the motor vehicles is about to enter the monitored geographic zone;

sending by a warning module mounted in the at least one of the motor vehicles and operatively connected to the on-board computer of the at least one of the motor vehicles a warning to the at least one of the motor vehicle as a result of detecting that the at least one of the motor vehicles is about to enter the monitored geographic zone;

detecting that the at least one of the motor vehicles entered the monitored geographic zone;

sending by the emitter the signal to the on-board computer of the at least one of the motor vehicles as a result of detecting that the at least one of the motor vehicles entered the monitored geographic zone; and determining if an infraction has occurred based on the at least one traffic parameter.

2. The method of claim 1, further comprising: if the infraction has occurred, storing the information about the infraction onto a driver's identification card.

3. The method of claim 1, further comprising sending video images from a camera of the at least one of the plurality of motor vehicles to the on-board computer and storing video images recorded by the camera onto the on-board computer for a desired period of time.

4. The method of claim 3, wherein a coded card containing the driver identification thereon is used to enter information into the associates ones of the on-board computers.

5. The method of claim 3, wherein the camera is mounted to one of a front and a rear of the at least one of the plurality of vehicles.

6. The method of claim 1, wherein the at least one traffic parameter is vehicle speed.

7. The method of claim 1, wherein the at least one traffic parameter is associated with a red light.

8. The method of claim 1, further comprising: if the infraction has occurred, at least decelerating the at least one of the plurality of motor vehicles.

9. The method of claim 1, wherein the motor vehicle position data are sent from a GPS to the on-board computer of the at least one of the pluralities of motor vehicles.

10. The method of claim 1, wherein each of the plurality of vehicles is operable only after a driver identification has been entered into associated ones of the on-board computers.

11. The method of claim 1, further comprising: communicating information about the infraction to a governmental authority as a result of determining that the infraction has occurred.

12. The method of claim 1, wherein the warning includes a signal to activate at least one of an audio and visual warning, and the warning module is the on-board computer.

* * * * *